(No Model.)

R. B. FOUZER.
STOCK FEEDING BOX.

No. 594,785. Patented Nov. 30, 1897.

Witnesses:
Franck L. Ourand
Jo. L. Coombs

Inventor:
Robert B. Fouzer,
G. Louis Bagger & Co.,
Attorneys.

UNITED STATES PATENT OFFICE.

ROBERT B. FOUZER, OF BUTLER, PENNSYLVANIA.

STOCK-FEEDING BOX.

SPECIFICATION forming part of Letters Patent No. 594,785, dated November 30, 1897.

Application filed May 22, 1897. Serial No. 637,681. (No model.)

*To all whom it may concern:*

Be it known that I, ROBERT B. FOUZER, a citizen of the United States, and a resident of Butler, in the county of Butler and State of Pennsylvania, have invented certain new and useful Improvements in Stock-Feeding Boxes; and I do hereby declare that the following is a full, clear, and exact description of the invention, which will enable others skilled in the art to which it appertains to make and use the same, reference being had to the accompanying drawings, which form a part of this specification.

My invention relates to stock-feeding boxes of that class or description in which the feed is automatically supplied to the animals as fast as consumed, thereby preventing waste; and its object is to provide an improved construction of the same by means of which the amount of feed supplied to an animal can be easily ascertained and the supply cut off when the requisite quantity has been consumed.

The invention consists, essentially, in a feed-receptacle having a spout at the lower end formed with an outlet-opening and an inclined feed-plate having a projecting horizontal portion, a slide-valve of the form hereinafter specified provided with an operating-rod for opening and closing said opening, and a hinged cover, and said receptacle having an opening in the front provided with a wire-gauze or perforated-metal cover, whereby the contents of the receptacle can be seen, yet prevented from escaping therethrough, and the edge of said opening formed with graduations or lines with figures and characters for indicating the amount of feed supplied to an animal, as hereinafter fully described and claimed.

Figure 1:
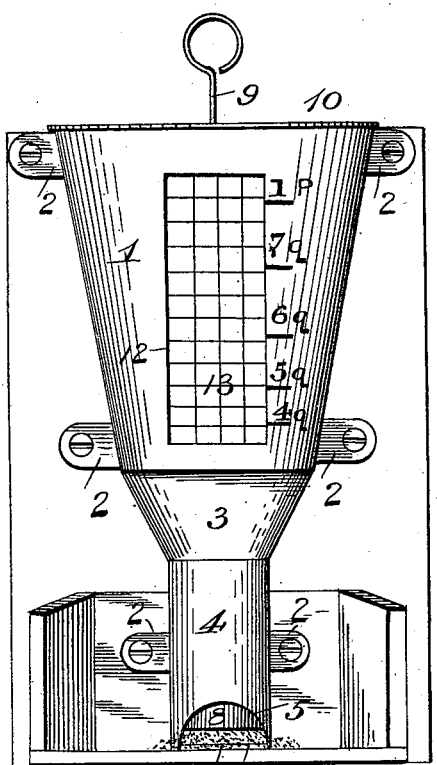
Figure 2:
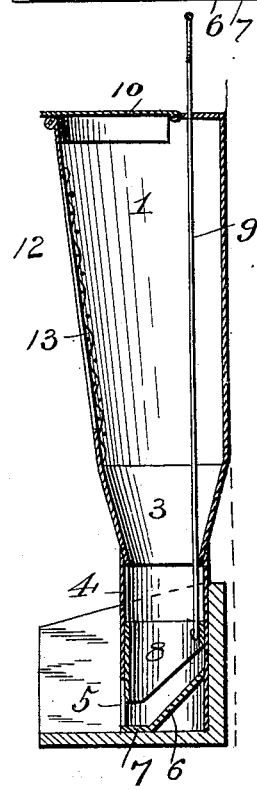

In the accompanying drawings, Figure 1 is a front elevation of a feed-box constructed in accordance with my invention. Fig. 2 is a central vertical cross-section of the same.

In the said drawings the reference-numeral 1 designates the feed-receptacle, preferably made semiconical or approximately semicylindrical in shape, provided with apertured lugs 2, by which it may be secured to a wall or other place by screws or nails passing through the lugs. The lower end of this receptacle is made tapering, as seen at 3, and is provided with a cylindrical spout 4, having an opening 5 in its lower end. Secured to the lower end of this spout is an inclined feed board or plate 6, having a horizontal portion 7, projecting in front of said opening. Located in said spout is a curved slide-valve 8, provided with a vertical operating-rod 9. By moving this rod up and down the valve will open and close the feed-opening 5. This slide consists of a short cylinder having its lower end cut away on an incline or bevel, so that the edge will correspond with the inclined feed-board.

The numeral 10 designates the hinged cover for the receptacle. In the front of said receptacle there is formed a rectangular opening 12, provided with a cover 13, of wire-gauze or perforated metal, the meshes or openings of which are sufficiently large to allow the contents to be seen, but not large enough to allow the grain or other feed to escape. At one of the vertical edges of this opening the receptacle is provided with a number of graduated marks or lines designated by figures and characters so arranged with respect to the capacity of the receptacle that the amount of feed withdrawn therefrom can be readily ascertained.

The operation is as follows: The receptacle is filled with grain or other feed and the valve 8 opened, when the feed will automatically be supplied to the horizontal portion of the feed-board. As fast as the animal consumes the feed a fresh supply is fed to the said horizontal portion of the feed-board. In this way waste of the feed is prevented, as it is only supplied as consumed. By means of the wire-gauze cover or perforated plate and the graduated marks and figures the amount of feed supplied to the animal can be readily ascertained, and when a sufficient amount has been consumed the supply can be cut off. By this means it is not necessary to measure the feed before placing it in the receptacle.

Having thus fully described my invention, what I claim is—

In a stock-feeding box, the combination with the feed-receptacle having an opening in front provided with a wire-gauze cover and provided with graduated marks at one edge of said opening, of the spout having an opening at the lower end, the inclined feed-board having a horizontal portion, located in said spout, the cylindrical slide-valve cut away on an incline at the lower end and fitting closely in said tube, and the operating-rod, substantially as described.

In testimony that I claim the foregoing as my own I have hereunto affixed my signature in presence of two witnesses.

ROBERT B. FOUZER.

Witnesses:
REUBEN McELVAIN,
J. HARRY MILLER.